(12) United States Patent
Bates et al.

(10) Patent No.: US 6,316,592 B1
(45) Date of Patent: Nov. 13, 2001

(54) METHOD FOR ISOLATING POLYMER RESIN FROM SOLUTION SLURRIES

(75) Inventors: Gary Mell Bates, Voorheesville; Hua Guo, Delmar, both of NY (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/564,825

(22) Filed: May 4, 2000

(51) Int. Cl.$^7$ .................................................. C08J 3/00
(52) U.S. Cl. .................................. 528/491; 528/502
(58) Field of Search .............................. 524/500; 528/491, 528/502

(56) References Cited

U.S. PATENT DOCUMENTS

| | | |
|---|---|---|
| 2,933,480 | 4/1960 | Gresham et al. . |
| 3,093,621 | 6/1963 | Gladding . |
| 3,211,709 | 10/1965 | Adamek et al. . |
| 3,257,357 | 6/1966 | Stamatoff . |
| 3,257,358 | 6/1966 | Stamatoff . |
| 3,306,874 | 2/1967 | Hay . |
| 3,306,875 | 2/1967 | Hay . |
| 3,646,168 | 2/1972 | Barrett . |
| 3,790,519 | 2/1974 | Wahlborg . |
| 3,803,085 | 4/1974 | Takehoshi et al. . |
| 3,884,993 | 5/1975 | Gros . |
| 3,894,999 | 7/1975 | Boozer et al. . |
| 3,905,942 | 9/1975 | Takekoshi et al. . |
| 3,914,266 | 10/1975 | Hay . |
| 4,028,341 | 6/1977 | Hay . |
| 4,059,654 | 11/1977 | Von Bodungen et al. . |
| 4,097,550 | 6/1978 | Haaf et al. . |
| 4,166,055 | 8/1979 | Lee, Jr. . |
| 4,217,438 | 8/1980 | Brunelle et al. . |
| 4,547,549 | 10/1985 | Nakamura et al. . |
| 4,584,334 | 4/1986 | Lee, Jr. et al. . |
| 4,806,297 | 2/1989 | Brown et al. . |
| 4,806,602 | 2/1989 | White et al. . |
| 4,935,472 | 6/1990 | Brown et al. . |
| 4,968,350 | * 11/1990 | Bindschaedler ...................... 106/170 |
| 5,006,590 | * 4/1991 | Takeda ................................. 524/458 |
| 5,237,005 | 8/1993 | Yates, III . |
| 5,859,130 | 1/1999 | Gianchandai et al. . |
| 5,981,656 | 11/1999 | McGaughan et al. . |

FOREIGN PATENT DOCUMENTS

| | | |
|---|---|---|
| 0100500 A1 | 2/1984 | (EP) . |
| 0411510 A2 | 2/1991 | (EP) . |
| 2378814 | 8/1978 | (FR) . |
| 1330947 | 9/1973 | (GB) . |

* cited by examiner

*Primary Examiner*—Paul R. Michl

(57) ABSTRACT

Soluble polymer resins are separated from a solution slurry with the use of a precipitation aid where the slurry contains the polymer resin in both a soluble form and a solid particulate phase. The precipitation aid absorbs onto the surface of the solid polymer resin particulates and is a suitable blend component for formulations of the polymer resin. The solution slurry may be concentrated and heated prior to precipitation of the polymer resin.

26 Claims, No Drawings

METHOD FOR ISOLATING POLYMER RESIN FROM SOLUTION SLURRIES

BACKGROUND OF THE INVENTION

1. Field of the Invention

This invention relates to methods for isolating polymer resins from solution slurries utilizing a precipitation aid.

2. Brief Description of Related Art

A number of methods have been disclosed for separating soluble thermoplastic resins from organic solvents. A majority of these methods are energy intensive requiring the removal of the organic solvent. More energy efficient means involve the precipitation or coprecipitation of the polymer resin from solution. These precipitation techniques can be hindered by the presence of a solid phase of fine particulates within the solution. These fine particulates are not easily recovered before precipitation of the soluble polymer resin and can interfere with the recovery of the precipitate. The presence of this solid particulate phase is particularly troublesome when attempting to employ equipment which is not adapted to handle fine particles.

An example where this problem occurs is in the copolymerization of 2,6-xylenol and 2,3,6-trimethylphenol via oxidative coupling. It is reported that most of the copolymers formed from these monomers spontaneously precipitate in the reaction mixture as very fine particles. This reaction mixture turns into a three-phase slurry comprising: a solid phase of copolymer particles, a copolymer solution phase and an aqueous phase. In the preparation of polyphenylene ether homopolymers with 2,6-xylenol, the polymer reaction product remains solubilized in the toluene reaction solution. After purification of the solution, the homopolymer is typically precipitated in methanol. The polyphenylene ether homopolymer of 2,6-xylenol precipitates as large size clusters suitable for liquid-solid filtration. In contrast, the three-phase reaction mixture obtained with the preparation of polyphenylene ether copolymers of 2,6-xylenol and 2,3,6-trimethylphenol is unsuitable for the polymer purification and isolation techniques used for the polyphenylene ether homopolymers of 2,6xylenol. Separate equipment is therefore required.

It is desirable to provide an isolation technique for polymer resins within a solution slurry that contains a solid phase of the polymer resin as fine particulates which does not require special equipment to remove these particulates.

SUMMARY OF THE INVENTION

This invention provides a method for a separating soluble polymer resin from a solution slurry that contains a solid phase of said polymer resin as particulates. This method comprises adding a precipitation aid to a solution slurry which contains a soluble polymer resin and a solid phase of said polymer resin as particulates. The precipitation aid is a linear or branched polymer which absorbs onto the surface of the polymer resin particulates. This polymeric precipitation aid is also a suitable blend component for formulations of the polymer resin to be isolated.

Following the addition of the precipitation aid, the solution slurry is added to a non-solvent for the soluble polymer resin to precipitate the soluble polymer resin in the solution slurry.

Following precipitation of the soluble polymer resin, it can be recovered by conventional techniques such as by conventional filtration techniques.

The polymer resins which can be isolated from a solution slurry by the methods of this invention have a weight average molecular weight of above about 500 as determined by differential scanning calorimetry. Suitable polymer resins include most thermoplastic resins, i.e., polymers which become plastic and flowable under the action of pressure and heat. Specific examples of suitable thermoplastic resins which can be isolated by the methods of this invention are: polycarbonates, polystyrenes, high impact polystyrenes, polyphenylene ethers, polyetherimides; polyamides; polyesters including polyethylene terephthalates and polybutylene terephthalates. The polymer resins suitable for use in this invention include both homopolymers and copolymers of these thermoplastic resins. The preferred thermoplastic resins employed in the methods of this invention are temperature sensitive polymer resins such as polyphenylene ether resins.

The polyphenylene ether resins suitable for use in the methods of this invention are typically prepared in solution by the oxidative coupling of at least one monohydroxy aromatic compound in the presence of a copper, manganese, or cobalt catalyst. These polyphenylene ether polymers comprise a plurality of aryloxy repeating units preferably with at least 50 repeating units of the following Formula I:

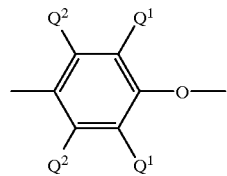

wherein in each of said units independently, each $Q^1$ is independently halogen, alkyl (preferably primary or secondary lower alkyl containing up to 7 carbon atoms), aryl (preferably phenyl), halohydrocarbon groups (preferably haloalkyl) having at least two carbons between the halogen atoms and the phenyl nucleus of Formula I, aminoalkyl, hydrocarbonoxy or halohydrocarbonoxy wherein at least two carbon atoms separate the halogen and oxygen atoms and at least two carbon atoms separate the halogen atoms and the phenyl nucleus of Formula I.

Each $Q^2$ is independently hydrogen, halogen, alkyl (preferably primary or secondary lower alkyl up to 7 carbon atoms), aryl (preferably phenyl), halohydrocarbon (preferably haloalkyl) having at least two carbon atoms between the halogen atoms and the phenyl nucleus of Formula I, hydrocarbonoxy groups or halohydrocarbonoxy groups wherein at least two carbon atoms separate the halogen and oxygen atoms and at least two carbon atoms separate the halogen atoms from the phenyl nucleus of Formula I. Each of $Q^1$ and $Q^2$ can suitably contain up to about 12 carbon atoms and most often, each $Q^1$ is an alkyl or phenyl, especially $C_1$–$C_4$ alkyl and each $Q^2$ is hydrogen.

The term "polyphenylene ether resin," as used in the specification and claims herein, includes:
  unsubstituted polyphenylene ether polymers;
  substituted polyphenylene ether polymers, wherein the aromatic ring is substituted;
  polyphenylene ether copolymers;
  polyphenylene ether graft polymers containing grafted moieties such as vinyl monomers, polystyrenes and elastomers;
  polyphenylene ether coupled polymers, wherein coupling agents, e.g., polycarbonates, form high molecular weight polymers; and end-capped polyphenylene ether polymers with functional end groups.

It will be apparent to those skilled in the art from the foregoing that the polyphenylene ether polymers contemplated for use in the methods of the present invention include all of those presently known, irrespective of the variations in structural units.

Specific polyphenylene ether polymers which can be used in the methods of the present invention include but are not limited to poly(2,6-dimethyl-1,4-phenylene ether);

poly(2,3,6-trimethyl-1,4-phenylene) ether;

poly(2,6-diethyl-1,4-phenylene) ether;

poly(2-methyl-6-propyl-1,4phenylene) ether;

poly(2,6-dipropyl-1,4-phenylene) ether;

poly(2-ethyl-6-propyl-1,4-phenylene)ether;

poly(2,6-dilauryl-1,4-phenylene) ether;

poly(2,6-diphenyl-1,4-phenylene) ether;

poly(2,6-dimethoxy-1,4 phenylene) ether;

poly(2,6-diethoxy-1,4-phenylene) ether;

poly(2-methoxy-6-ethoxy-1,4-phenylene) ether;

poly(2-ethyl-6-stearyloxy-1,4-phenylene) ether;

poly(2,6-dichloro-1,4-phenylene) ether;

poly(2-methyl-6-phenyl-1,4-phenylene) ether;

poly(2-ethoxy-1,4-phenylene) ether;

poly(2-chloro-1,4-phenylene) ether;

poly(2,6-dibromo-1,4-phenylene) ether;

poly(3-bromo-2,6-dimethyl-1,4-phenylene) ether; mixtures thereof, and the like.

The methods of this invention provide effective results with polyphenylene ether resins which are copolymers of 2,6-dimethyl-1,4-phenylene ether units (from 2,6-xylenol) and 2,3,6-trimethyl-1,4-phenylene ether units (from 2,3,6-trimethylphenol) which typically form fine particulates in the reaction medium.

Specific examples of suitable polyphenylene ether resins and methods for preparing these polyphenylene ether resins are set forth in U.S. Pat. Nos. 3,306,874, 3,306,875, 3,914, 266 and 4,028,341 (Hay); U.S. Pat. Nos. 3,257,357 and 3,257,358 (Stamatoff); U.S. Pat. Nos. 4,935,472 and 4,806, 297 (S. B. Brown et al.); and U.S. Pat. No. 4,806,602 (White et al.).

Examples of polyamides suitable for use in the methods of this invention are disclosed in U.S. Pat Nos. 5,981,656 and 5,859,130. Suitable polyetherirrnides are described in U.S. Pat Nos. 3,803,085 and 3,905,942. Suitable polyesters include polybutylene terephthalate and polyethylene terephthalate and those disclosed in U.S. Pat No. 5,237,005. Suitable polycarbonates are described in U.S. Pat No. 4,217, 438.

The polystyrene resins suitable for use in this invention include homopolystyrene, polyalpha-methylstyrene, polychlorostyrene and styrene copolymers such as styrene-acrylonitrile copolymers (SAN), acrylate-styrene-acrylonitrile copolymers (ASA), acrylonitrile-butadiene-styrene copolymers (ABS), styrene-maleic anhydride copolymers, styrene-ethylvinylbenzene copolymers and styrene-divinylbenzene copolymers.

Suitable rubber modified polystyrene resins (referred to herein as high impact polystyrene or "HIPS") comprise blends and grafts of polystyrene with elastomeric polymers such as polybutadiene.

An important feature of this invention is the presence of both polymer resin particulates as a solid phase and polymer resin solubilized within the solvent of the solution slurry. While the solid polymer resin particulate phase can interfere with the isolation of the solubilized polymer resin from the solution slurry in conventional techniques, these polymer resin particles take part in the recovery of soluble polymer resin from the solution slurry in this invention.

The solid polymer resin particulates within the solution slurry can be of any size; however, it is impractical to utilize solids of a size that can be removed easily by conventional filtration techniques. This invention provides advantage with solution slurries having solid polymer resin particles that fall within the range of about 1 to 500 microns. The method of the present invention proves more advantageous with solution slurries that contain solids of an average particle size in the range of from 10 to 75 microns. Preferred solution slurries are the reaction media of solution polymerization processes that contain the polymer resin product in a solid phase (particulates) and a soluble (solvent) phase. An example of such a reaction medium is that of polyphenylene resins prepared in toluene, more particularly, copolymers of 2,6-xylenol (2,6-dimethylphenol) and 2,3,6-triethylphenol prepared in toluene. These slurries typically have particle sizes of below 10 microns.

While the polymer resin particles of the solid phase can vary widely in size, it is preferable that there be some uniformity in size to aid the eventual separation of the polymer resin from the solution slurry.

The concentration of solid polymer resin particulates within the solution slurry can also vary widely and is preferably less than 70 wt. % based on the weight of a total solution slurry. The methods of this invention can be performed with levels of polymer resin particulates of less than 1%, based on the weight of the total solution slurry. However, it may be possible to ignore the polymer resin solids at such low levels. The use of the methods of this invention at low solid levels such as this is inefficient. Concentrations of polymer resin particulates of from 10 to 60 wt. %, based on the total weight of the slurry are more typical. The reaction media of solution polymerization processes which contain the polymer resin may not have solids at these levels. Therefore, it may be desirable to concentrate the reaction medium to solids levels in this range or at least 10 to 30 wt. %, based on the total weight of the slurry. With higher concentrations of polymer resin particulates, the probability increases that these particulates will interact with the soluble polymer resin and each other.

The solution slurry utilized in this invention contains one or more organic solvents that solubilizes the lower molecular weight species of the polymer resin to provide a soluble polymer resin phase therein. Examples of suitable solvents for the solution slurry include chlorinated and brominated hydrocarbons having from 1 to 20 carbon atoms such as methylene chloride, 1,1,2,2-tetrachloroethane, 1,2-dichloroethylene, chlorobenzene, chloroform, dichlorobenzene, 1,1,2-trichloroethane and aromatic and aliphatic hydrocarbon solvents such as benzene, xylene, toluene, pyridine, mesitylene, hexane, pentane, heptane and the like. Mixtures of the above solvents are also suitable. Where it is desirable to concentrate the slurry, it is preferable to employ solvents with a boiling point below 100 C. Methylene chloride is a preferred organic solvent for use with polycarbonate resin and toluene is a preferred solvent for both polystyrene and polyphenylene ethers.

The solubilized resin is distinguished from the solid particulate phase by molecular weight. The intrinsic viscosity of the polymer resin which comprises the solid phase can be 2 or 4 times higher than the intrinsic viscosity of the solubilized polymer resin. The concentration of soluble resin within the solution slurry can vary widely with amounts up to 60 wt % of the total solution slurry being suitable. Where the solution slurry is a reaction medium of a solution polymerization process that contains polymer resin, the concentration of the polymer resin will depend on the extent of polymerization performed in the reaction medium. Solution slurries which are the reaction medium of a polyphenylene ether oxidative coupling reaction typically have a soluble polyphenylene ether resin at a concentration of about 5 to 25 wt % of the total composition.

To this solution slurry there is added a linear or chain-branched polymeric precipitation aid. This precipitation aid absorbs onto the surface of the solid resin particulates of the solid phase within the solution slurry. Not being bound by theory, it is believed that the polymer chains of the precipitation aid entangle and the precipitation aid then functions as a flocculent. This precipitation aid must be a suitable blend component of the final formulation for the polymer resin in that the precipitation aid is not separated from the polymer resin recovered. Suitable polymerization aids will depend on the polymer resin to be isolated since this precipitation aid must be compatible with the polymer resin in the final formulation. With respect to polycarbonates, suitable polymerization aids include impact modifiers as well as polyesters (polybutylene-terephthalates) and polyimides. For polyphenylene ether resins, suitable precipitation aids include impact modifiers, polystyrenes as discussed above, and polyamides. Impact modifiers also provide suitable precipitation aids for polystyrenes, polyetherimides, polyamides, and polyesters in that these resins are typically formulated with impact modifiers when providing molded articles.

Suitable impact modifiers which can function as a precipitation aid include natural rubbers, synthetic rubbers and thermoplastic elastomers.

Suitable thermoplastic elastomers are homopolymers and copolymers of monomers selected from the group consisting of olefins (e.g., ethylene, propylene, 1-butene, 4-methyl-1-pentene), styrene, alpha-methyl styrene, conjugated dienes (e.g., butadiene, isoprene and chloroprene) vinylcarboxylic acids (e.g., acrylic acid and alkylacrylic acids) and derivatives of vinylcarboxylic acids (e.g., vinylacetate, ethylacrylate, methyl methacrylate acrylonitrile). Suitable copolymers include random, block and graft copolymers of these monomers, discussed more particularly below.

Specific examples of suitable olefin homopolymers that can be used as a precipitation aid include polyethylene, polypropylene and polyisobutylene. The polyethylene homopolymers include LLDPE (linear low density polyethylene), HDPE (high density polyethylene), MDPE (medium density polyethylene) and isotatic polypropylene. Polyolefin resins of this general structure and methods for their preparation are well known in the art and are described for example in U.S. Pat. Nos. 2,933,480, 3,093,621, 3,211,709, 3,646,168, 3,790,519, 3,884,993, 3,894,999, 4,059,654, 4,166,055 and 4,584,334.

Copolymers of polyolefins may also be used as precipitation aids including copolymers of ethylene and alpha olefins (propylene and 4-methylpentene-1) and EPDM copolymers (copolymers of ethylene, $C_3$–$C_{10}$ monoolefins and non-conjugated dienes).

Specific examples of conjugated diene homopolymers and random copolymers that can be used as precipitation aids include polybutadiene, butadiene-styrene copolymers, butadiene-acrylate copolymers, isoprene-isobutene copolymers, chlorobutadiene polymers, butadiene acrylonitrile polymers and polyisoprene.

Particularly useful precipitation aids are the styrene polymers, preferably styrene block copolymers with conjugated dienes. These include the AB (di-block), $(AB)_m$-R (di-block) and ABA' (tri-block) block copolymers where blocks A and A' are typically styrene or a similar alkenyl aromatic unit and block B is typically a conjugated diene unit. For block copolymers of formula $(AB)_m$-R, integer m is at least 2 and R is a multifunctional coupling agent for the blocks of the structure AB. Suitable conjugated diene blocks include the conjugated diene homopolymers and copolymers described above which may be partially or entirely hydrogenated. The suitable alkenyl aromatics other than styrene include alpha-methyl styrene, para-methyl styrene, vinyl toluene, vinyl xylene and vinyl naphthalene. Examples of triblock copolymers of this type are polystyrene-polybutadiene-polystyrene (SBS), hydrogenated polystyrene-polybutadiene-polystyrene, styrene-ethylene-butylene-styrene (SEBS), polystyrene-polyisoprene-polystyrene (SIS) and poly(alpha methylstyrene)-polyisoprene—poly(alpha methylstyrene). Examples of commercially available triblock copolymers are the CARIFLEX®, KRATON D® and KRATON G® series from Shell Chemical Company.

Also suitable as precipitation aids are impact modifiers comprising a radial block copolymer of a vinyl aromatic monomer and a conjugated diene monomer. Copolymers of this type generally comprise about 60 to 95 wt % polymerized styrene or similar vinyl aromatic monomer and about 40 to 5 wt % polymerized conjugated diene monomer. The copolymer has at least three polymer chains which form a radial configuration. Each chain terminates in an substantially nonelastic segment, to which the elastic polymer segment is joined. These block copolymers are sometimes referred to as "branched" polymers as described in U.S. Pat. No. 4,097,550.

The preferred precipitation aid for a given polymer resin will be determined not only by the degree to which the precipitation aid absorbs onto the surface of the solid resin particulates, but also by the precipitation aids role in the final formulation of the polymer resin. Impact modifiers and other polymer resins are often used in significant amounts in engineering thermoplastic resin formulations. Use of these materials as precipitation aids will place fewer restrictions on the final formulation. For the impact modifiers, styrene copolymers, particularly ABA block copolymers containing styrene units and conjugated diene units or hydrogenated diene units (ethylene-butylene units) are effective precipitation aids for polyphenylene ethers which include copolymers of 2,3,6-trimethylphenol and 2,6-xylenol. Amounts of precipitation aid in the range of 0.5 wt % to 10 wt %, based on the weight of the total solids within the reaction medium (polyphenylene ether and precipitation aid) have been shown to be effective. In a preferred embodiment, the styrene copolymer is a styrene-ethylene-butylene-styrene block copolymer such as those of KRATON G® series available from Shell Chemical Company.

The precipitation aid may be added as a solid that is dispersed in the solution slurry or it may be added in the form of a solution. Adding a precipitation aid to the solution slurry can be accomplished by utilizing conventional equipment.

Once the precipitation aid has been added to the solution slurry, an optional procedure is to concentrate the solution slurry before precipitation of the resin is initiated. Preferred concentrations for the resin within the solution slurry will vary depending on the particular resin. For polyphenylene ether solutions, resin concentrations in the range of 10 to 48% are preferred. In concentrating the solution slurry, it is preferable to heat the solution slurry with or without the application of vacuum. Methods consistent with those described in U.S. Pat. No. 4,692,482 can be used. Applying vacuum will help concentrate the formulation.

Heating the slurry has been found to enhance the absorption activity of the precipitation aid onto the solid resin particulates. Temperatures in the range of 50° C. and above will provide effective results. Upper temperature limits will be dependent on the thermal sensitivity of the polymer resin as well as the loss in efficiency of the method employed. For polyphenylene ether resins, temperatures in the range of 60° C. to 115° C. have been found to be effective in enhancing the absorption of a precipitation aid to the polymer resin particulates.

Following the addition of the precipitation aid, the solution slurry is added to a non-solvent for the soluble polymer resin therein so as to precipitate the soluble polymer resin. The term "non-solvent" as used herein intends to refer to solvents that provide a lower solubility for the polymer resin than the solvent of said solution slurry. For a reaction medium of a solution polymerization process that contains polyphenylene ether polymer products and toluene solvent, methanol is a preferred non-solvent. This is also the case where the polyphenylene ether polymer is a copolymer 2,6-xylenol and 2,3,6-trimethylphenol. Where the solution slurry has been heated to enhance the absorption of the precipitation aid to the solid polymer resin particulates, it is preferable to quench this heated solution slurry with the non-solvent to stop the agglomeration process. The amount of non-solvent employed is typically from 1 to 4 times the volume of the solution slurry. After the addition of non-solvent, the solution slurry may be agitated if desired. The polymer resin precipitate within the solution slurry may be recovered by conventional means such as through the use of a filter, with or without filter paper. Preferably, the polymer resin is recovered as particles of an average particle size greater than 100 microns to permit the use of filters and/or filter paper having pores of a size above 20 microns, preferably above 50 microns and most preferably above 100 microns. With the increase in pore size, the speed of filtration is increased. Preferably over 90%, more preferably over 95%, of the polymer resin is recovered from the solution slurry by precipitation as solids with a particle size greater than 100 microns.

Although a portion of the particles recovered contain the precipitation aid, it has been found that the resins retain their glass transition temperature, as is evidenced by the differential scanning calorimetry.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

The entire disclosure of all applications, patents and publications, cited above are hereby incorporated by reference.

EXAMPLES

Formulation Of Solution Slurry

Copolymerization of 2,6-xylenol and 2,3,6-trimethylphenol by oxidative coupling was performed in toluene on a pilot plant scale in a 50 gal reactor. The total monomer charge was 52 lbs. Of the total monomer charge, 50 wt % was 2,3,6-trimethylphenol. 320 lb of solvent was also added that made the total monomer charge about 14 wt % of the reaction medium. A copper/amine catalyst: Cu/dibutylmethylene diamine (DBEDA) 1:1.5, was used at a level which provided a Cu/phenol ratio of 1:300. After 5 hours of reaction, the catalyst was neutralized and removed. The final reaction contains 11% of soluble polymer based on total monomer charge.

Examples 1–8

Samples (20g) of the solution slurry described above were mixed with styrene-ethylene butylene styrene (SEBS) block copolymer sold under the trade name: KRATON®GX 1702, available from Shell Chemical Co. The amount of SEBS block copolymer employed in each example is given in Table 1. Selected solution slurries were pre-concentrated in either a 60° C. vacuum oven or 115° C. oil bath, as specified in Table 1. The solids concentration of the solution slurry at the time of precipitation is given in Table 1 as wt %, based on the weight of the total slurry. The solution slurries were then precipitated into 2.5 times of their volume (about 50 ml) of agitated methanol at either room temperature or 50° C., as indicated in Table 1. The precipitated material was vacuum filtered using a "Fritted Buchner Funnel" (middle pore size-10–15 microns).

The time of filtration is used as the testing standard for preparing desirable particles and these values are reported in Table 1. Because not all of the pre-concentrated material could be transferred into methanol, the "filtration rate" is reported in Table 1 for each example. Filtration rate is the filtration time divided by the weight of final dry material obtained. The data shows rapid filtration times and filtration rates under all conditions, even without pre-concentration as compared to the Comparative Examples Y and Z. Pre-concentration enhanced the filtration time and rate and pre-concentration at higher temperatures (115° C.) improved these values even further. Using less than 10 wt % SEBS coprecipitant (5 wt %) can impact performance as shown in Table 1.

Comparative Examples Y and Z

For comparison purposes, 20 g samples of the solution slurry prepared above were pre-concentrated as indicated in Table 1 and precipitated in agitated methanol, as described in Examples 1–8. The solution slurries of the comparative examples were not precipitated with the precipitation aid, SEBS rubber. The comparative examples required significantly longer filtration times and higher filtration rates. The filtration time of Comparative Example Y is eight times longer than the filtration time of Example 3, which was pre-concentrated and precipitated under similar conditions. The difference in the filtration rates is even longer. The filtration time of Comparative Example Z is about 9 times greater than the filtration time for Example 6, which was pre-concentrated and precipitated under similar conditions.

TABLE 1

| Example | Solids (wt %) | SEBS (wt %) | Conc. procedures (EC) | Methanol (EC) | Filtration Time (Sec) | Filtration Rate (Sec) |
|---|---|---|---|---|---|---|
| 1 | 15.2 | 10.0 | NA | RT | 60 | 21 |
| 2 | 15.2 | 10.0 | NA | 50 | 60 | 20 |
| 3 | 25.7 | 10.0 | 55 + vacuum | RT | 30 | 15 |
| 4 | 23.0 | 10.0 | 55 + vacuum | 50 | 15 | 6.1 |
| 5 | 16.4 | 10.0 | 115 | RT | 14 | 5.2 |
| 6 | 23.0 | 10.0 | 115 | RT | 10 | 3.9 |

TABLE 1-continued

| Example | Solids (wt %) | SEBS (wt %) | Conc. procedures (EC) | Methanol (EC) | Filtration Time (Sec) | Filtration Rate (Sec) |
|---|---|---|---|---|---|---|
| 7 | 18.8 | 5.0 | 115 | RT | 25 | 8.9 |
| 8 | 24.3 | 5.0 | 115 | RT | 15 | 7.9 |
| Y | 29.5 | 0 | 55 + vacuum | 50 | 480 | 258 |
| Z | 21.8 | 0 | 115 | 50 | 93 | 61 |

Examples 9–10 and Comparative Example X

Another solution slurry comprising a copolymer of 2,6-xylenol and 2,3,6-trimethylphenol was prepared by oxidative coupling in toluene on a pilot plant scale as described above. The catalyst was removed from the solution slurry before precipitation.

Samples of this solution slurry (about 100 g) with catalyst removed were mixed with about 5.04 wt % or 10 wt % KRATON® GX-1702 styrene ethylene butylene sytrene block copolymer available from Shell Chemical Co. Two solution slurries, A and B, were tested in Example 9, both having about 5.04 wt % SEBS block copolymers. Three solution slurries, A, B and C, were tested in Example 10. The amounts of SEBS block copolymer employed in the solution slurries of Examples 9 and 10 are reported in Table 2. Comparative Example X was a solution slurry that did not employ SEBS block copolymer.

Each solution slurry was pre-concentrated in a 115° C. oil bath and precipitated into 2.5 times the volume of agitated methanol at room temperature. The precipitated material was then vacuum filtered using a Buchner funnel and filter paper of various pore sizes (20 microns, 50 microns, 100 microns), as indicated in Table 2.

The results show an increase in the yield of the precipitate (filtration yield) with the use of a SEBS block copolymer precipitation aid as compared to Comparative Example X. The results also show that the level of precipitation aid has an effect on the particle size of the precipitate, with high levels of the SEBS block copolymer precipitation aid, filter papers with larger pore sizes (100 microns and 50 microns) can be used while maintaining high yields above 90%, as shown in Table 2.

TABLE 2

| Example # | Free Solid (wt %) | SEBS (wt %) | Filter Cloth Pore Size (microns) | Effluent | Filtration Yield (%) |
|---|---|---|---|---|---|
| Example 9A | 19.8 | 5.04 | 20 | Clean | 95.1 |
| 9B | 19.8 | 5.04 | 50 | Turbid | 92.8 |
| Example 10A | 18.9 | 10 | 20 | Clean | 97.8 |
| 10B | 19.9 | 10 | 50 | Clean | 98.5 |
| 10C | 19.8 | 10 | 100 | Clean | 98.6 |
| Comparative Example X | 20 | 0 | 20 | Turbid | 0 |

From the foregoing description, one skilled in the art can easily ascertain the essential characteristics of this invention, and without departing from the spirit and scope thereof, can make various changes and modifications of the invention to adapt it to various usages and conditions.

What is claimed:

1. A method for separating a soluble polymer resin from a solution slurry, which contains a solid phase of said polymer resin as particulates, said method comprising:
   adding to a solution slurry which contains at least one soluble polymer resin selected from the group consisting of polycarbonates, polystyrenes, rubber modified polystyrenes, polyphenylene ethers, polyetherimides, polyamides, and polyesters and a solid phase of said polymer resin as particulates, a linear or chain-branched polymeric precipitation aid which absorbs onto the surface of the polymer resin particulates in said solution slurry, wherein said precipitation aid is a suitable blend component for formulations of said polymer resin; and
   adding the solution slurry, which contains said precipitation aid, to a non-solvent for the soluble polymer resin to precipitate the soluble polymer resin within said solution slurry.

2. A method as in claim 1 comprising the additional step of recovering the precipitate from said solution slurry.

3. A method as in claim 2, wherein the precipitate is recovered from said solution slurry by filtration through a filter having a pore size greater than 100 microns.

4. A method as in claim 2, wherein over 90% of the total polymer resin in said solution slurry, including the soluble polymer resin and the solid phase polymer resin, is recovered as particles of a size greater than 100 microns.

5. A method as in claim 1, wherein the soluble polymer resin within the solution slurry is a polyphenylene ether resin.

6. A method as in claim 1, wherein the soluble polymer resin within said solution slurry is a copolymer of 2,6-xylenol and 2,3,6-trimethylphenol and the solution slurry is a reaction medium of a solution polymerization process in which said copolymer has been produced.

7. A method as in claim 1, which comprises the additional step of concentrating said solution slurry after the addition of said precipitation aid to achieve a concentration of soluble polymer resin above 10%, based on the total weight of said solution slurry.

8. A method as in claim 7, wherein said solution slurry is concentrated by heating to a temperature above 50° C., optionally with the application of vacuum.

9. A method as in claim 5, wherein the precipitation aid is selected from the group consisting of polyesters, polystyrenes, polyamides, and impact modifiers.

10. A method as in claim 9, wherein the impact modifier is selected from the group consisting of natural rubbers, synthetic rubbers and thermoplastic elastomers selected from the group consisting of olefin homopolymers, olefin copolymers, styrene homopolymers, styrene copolymers, homopolymers of conjugated dienes, copolymers of conjugated dienes, homopolymers of vinyl carboxylic acids, copolymers of vinyl carboxylic acids, homopolymers of derivatives of vinyl carboxylic acids and copolymers of derivatives of vinyl carboxylic acids.

11. A method as in claim 10, wherein the olefin copolymers comprise EPDM copolymers, the conjugated diene homopolymers comprise polybutadiene and the styrene copolymers include AB, (AB)-R and ABA block copolymers.

12. A method as in claim 11, wherein the styrene block copolymers comprise styrene-butadiene-styrene block copolymers,
   styrene-ethylene-butylene-styrene block copolymers,
   polystyrene-polyisoprene-polystyrene block copolymers,
   hydrogenated polystyrene-polybutadiene-polystyrene block copolymers and
   poly(alpha-methylstyrene)-polyisoprene-poly(alpha-methylstyrene) block copolymers.

13. A method as in claim 10, wherein the styrene copolymer is a styrene block copolymer.

14. A method as in claim 1, wherein the amount of precipitation aid added to said solution slurry falls within the range of 1 to 10 wt. %, based on the total weight of soluble polymer resin in said solution slurry.

15. A method for separating a soluble polyphenylene ether resin from a solution slurry, said method comprising:

adding to a solution slurry which contains at least one soluble polyphenylene ether resin and a solid phase of polyphenylene ether resin particulates, a linear or chain-branched polymeric precipitation aid which absorbs onto the surface of the polyphenylene ether particulates within said solution slurry, wherein said precipitation aid is a blend component for the final formulation of said polyphenylene ether resin;

adding the solution slurry, which contains the precipitation aid, to a non-solvent for the soluble polyphenylene ether resin so as to precipitate said soluble polyphenylene ether resin in said solution slurry.

16. A method as in claim 15, comprising the additional step of recovering the precipitate from said solution slurry.

17. A method as in claim 15, wherein the precipitate is recovered from said solution slurry by filtration through a filter having a pore size greater than 100 microns.

18. A method as in claim 15, wherein over 90% of the total polyphenylene ether resin in said solution slurry, including the soluble polyphenylene ether polymer resin and the solid polyphenylene phase polymer resin, is recovered as particles of a size greater than 100 microns.

19. A method as in claim 15, wherein the polyphenylene ether resin within said solution slurry is a copolymer of 2,6-dimethylphenol and 2,3,6-trimethylphenol and the solution slurry is a reaction medium of a solution polymerization process which produces said copolymer.

20. A method as in claim 15, which comprises the additional step of concentrating said solution slurry after the addition of said precipitation aid to achieve a concentration of soluble polymer resin above 25%, based on the total weight of said solution slurry.

21. A method as in claim 15, wherein said solution slurry is concentrated by heating to a temperature above 50° C., optionally with the application of vacuum.

22. A method as in claim 15, wherein the precipitation aid is selected from the group consisting of impact modifiers.

23. A method as in claim 22, wherein the impact modifier is selected from the group consisting of thermoplastic elastomers selected from the group consisting of olefin homopolymers, olefin copolymers, styrene homopolymers, styrene copolymers, homopolymers of conjugated dienes and copolymers of conjugated dienes.

24. A method as in claim 15, wherein the olefin copolymers comprise EPDM copolymers, the conjugated diene homopolymers comprise polybutadiene and the styrene copolymers comprise styrene block copolymers.

25. A method as in claim 15, wherein the styrene block copolymers comprise styrene-butadiene-styrene block copolymers, styrene-ethylene-butylene-styrene block copolymers, polystyrene-polyisoprene-polystyrene block copolymers, hydrogenated polystyrene-polybutadiene-polystyrene block copolymers and poly(alpha-methylstyrene)-polyisoprene-poly(alpha-methylstyrene) copolymers.

26. A method as in claim 15, wherein the amount of precipitation aid added to said solution slurry falls within the range of 1 to 10 wt. %, based on the total weight of soluble polyphenylene ether polymer resin in said solution slurry.

* * * * *